(12) United States Patent
Farrenkopf

(10) Patent No.: US 9,515,555 B2
(45) Date of Patent: Dec. 6, 2016

(54) FLOATING POWER CONVERTER HAVING MULTIPLE VOLTAGE INPUTS

(71) Applicant: RF Micro Devices, Inc., Greensboro, NC (US)

(72) Inventor: Douglas R. Farrenkopf, Carlsbad, CA (US)

(73) Assignee: Qorvo US, Inc., Greensboro, NC (US)

(*) Notice: Subject to any disclaimer, the term of this patent is extended or adjusted under 35 U.S.C. 154(b) by 588 days.

(21) Appl. No.: 13/660,582

(22) Filed: Oct. 25, 2012

(65) Prior Publication Data

US 2013/0113286 A1    May 9, 2013

Related U.S. Application Data

(60) Provisional application No. 61/555,816, filed on Nov. 4, 2011.

(51) Int. Cl.
*H02M 3/158* (2006.01)
*H02J 1/00* (2006.01)

(52) U.S. Cl.
CPC ....... *H02M 3/1582* (2013.01); *H02J 2001/008* (2013.01); *Y10T 307/50* (2015.04)

(58) Field of Classification Search
CPC ................ H02J 2001/008; H02M 2001/0006; H02M 2001/007; H02M 2001/008; H02M 2001/009; H02M 3/158; H02M 3/1582
See application file for complete search history.

(56) References Cited

U.S. PATENT DOCUMENTS

| 3,579,074 | A | * | 5/1971 | Richell | H02M 3/07 307/110 |
| 4,052,751 | A | * | 10/1977 | Shepard | H02H 3/331 361/113 |
| 6,018,229 | A | * | 1/2000 | Mitchell et al. | 320/112 |
| 6,781,351 | B2 | * | 8/2004 | Mednik et al. | 323/222 |
| 7,336,056 | B1 | | 2/2008 | Dening | |
| 7,705,489 | B2 | * | 4/2010 | Nielsen et al. | 307/66 |

(Continued)

OTHER PUBLICATIONS

Covi, Kevin, "A Combined Buck and Boost Converter for Single-Phase Power-Factor Correction", 2005 IBM Power and Cooling Technology Symposium, Powerpoint Presentation, Oct. 7, 2005, 33 pages, New York, New York, USA.

(Continued)

*Primary Examiner* — Harry Behm
*Assistant Examiner* — Peter Novak
(74) *Attorney, Agent, or Firm* — Withrow & Terranova, P.L.L.C.

(57) ABSTRACT

A floating power converter includes direct current to direct current (DC-DC) converter circuitry having at least one converter control terminal for receiving at least one control signal, a high side (H-S) converter input terminal, a low side (L-S) converter input terminal, and a converter output terminal. The floating power converter also has an H-S source selector configured to selectively couple either a first H-S voltage source or a second H-S voltage source to the H-S converter input terminal in response to a selector control signal. Moreover, an L-S source selector is configured to selectively couple either a first L-S voltage source or a second L-S voltage source to the L-S converter input terminal in response to the selector control signal.

20 Claims, 5 Drawing Sheets

(56) References Cited

U.S. PATENT DOCUMENTS

| | | | | |
|---|---|---|---|---|
| 8,120,334 B2* | 2/2012 | Valley et al. | | 323/222 |
| 8,238,126 B2* | 8/2012 | Ruan et al. | | 363/65 |
| 8,853,888 B2* | 10/2014 | Khaligh | | 307/80 |
| 8,860,387 B2* | 10/2014 | Kobayashi | | 323/259 |
| 9,276,463 B2* | 3/2016 | Fleming | | H02M 3/07 |
| 2005/0081068 A1* | 4/2005 | Sakakibara | | G06F 1/26 |
| | | | | 713/300 |
| 2008/0191556 A1* | 8/2008 | Hong et al. | | 307/64 |

OTHER PUBLICATIONS

Midya, Pallab et. al., "Buck or Boost Tracking Power Converter", IEEE Power Electronics Letters, Dec. 2004, pp. 131-134, vol. 2, No. 4., Lake Zurich, IL, USA.

Restrepo C. et. al., "A Noninverting Buck-Boost DC-DC Switching Converter with High Efficiency and Wide Bandwidth", IEEE Transactions on Power Electronics, Sep. 2011, pp. 2490-2503, vol. 26, Issue 9, Tarragona, Spain.

Sahu, Biranchinath et. al., "A High-Efficiency, Dual-Mode, Dynamic, Buck-Boost Power Supply IC for Portable Applications", 2005 International Conference on VLSI Design, Jan. 2005, pp. 858-861, Atlanta, GA, USA.

Wu, Ying et. al., "An Area- and Power-Efficient Monolithic Buck Converter with Fast Transient Response", IEEE 2009 Custom Integrated Circuits Conference (CICC), 2009, pp. 307-310, Clear Water Bay, Hong Kong, China.

* cited by examiner

FLOATING POWER CONVERTER HAVING MULTIPLE VOLTAGE INPUTS

RELATED APPLICATIONS

This application claims the benefit of U.S. provisional patent application No. 61/555,816, filed Nov. 4, 2011, the disclosure of which is incorporated herein by reference in its entirety.

FIELD OF THE DISCLOSURE

The present disclosure relates to direct current to direct current (DC-DC) switching power converters, which may be used in battery powered equipment.

BACKGROUND

DC-DC switching power converters are often used when a system needing a regulated power supply is powered from an unregulated DC source of power, or a regulated DC source of power at a different voltage. Typically, switching power converters are used when either the output voltage is higher than the input voltage, or the input voltage is higher than the output voltage, but not both. However, some applications require a switching power converter that can supply an output voltage that may be either higher or lower than an input voltage. One example is a battery powered system needing a regulated supply voltage at 3 volts DC. The battery supplying the battery powered system may be a lithium battery having an output voltage that varies from 3.3 volts DC down to 2.5 volts DC. A switching power converter that has an output voltage higher than the input voltage may be referred to as a boost converter. A switching power converter that has an output voltage lower than the input voltage may be referred to as a buck converter. By cascading a buck converter and a boost converter, a switching power converter can be created that can supply an output voltage that may be either higher or lower than an input voltage.

A switching power converter typically operates with a switching frequency. During each cycle of the switching frequency, an energy storage element, such as an inductor, is switched to receive power from an input power source for one portion of the cycle. For another portion of the cycle, the energy storage element is switched to provide some of its stored energy to downstream circuitry. The percentage of the cycle that the energy storage element is switched to receive power is known as the duty-cycle, which is varied to regulate the output of the switching power converter.

A switching power converter may be arranged with a DC power source feeding a boost power converter, which feeds a buck power converter that provides the DC output. Typically, such switching power converters employ more than one inductor for energy storage. As a result, switching power converters having both a boost converter and buck converter are larger and not as energy efficient as desired. What is needed is a switching power converter that employs only a single inductor in a buck converter stage that provides a simpler, smaller, and more energy efficient solution.

SUMMARY

A floating power converter is provided that includes direct current to direct current (DC-DC) converter circuitry having at least one converter control terminal for receiving at least one control signal, a high side (H-S) converter input terminal, a low side (L-S) converter input terminal, and a converter output terminal. The floating power converter also has an H-S source selector configured to selectively couple either a first H-S voltage source or a second H-S voltage source to the H-S converter input terminal in response to a selector control signal. Moreover, an L-S source selector is configured to selectively couple either a first L-S voltage source or a second L-S voltage source to the L-S converter input terminal in response to the selector control signal.

In operation, a selector control signal received by the H-S source selector urges the H-S source selector to selectively couple either the first H-S voltage source or the second H-S voltage source to the H-S source output terminal. Similarly, the selector control signal received by the L-S source selector urges the L-S source selector to selectively couple either the first L-S voltage source or the second L-S voltage source to the L-S source output terminal.

In one embodiment, the DC-DC converter circuitry combined with an output filter provides a buck converter function. Also, the first H-S voltage source is a charge pump that boosts the voltage level of an equivalent voltage level of the second H-S voltage source by a factor of two. Moreover, in this exemplary embodiment, the first L-S voltage source is equivalent to the second H-S voltage source and the second L-S voltage source is at ground potential. As such, in one mode commanded by the selector control signal, the H-S source selector and the L-S source selector will pair a coupling of the first output source to the H-S source output terminal with a coupling of the first L-S source to the L-S source output terminal. As a result, the DC-DC converter circuitry combined with the output filter will provide an output voltage that ranges between a lower voltage level of the first L-S voltage source and a higher voltage level of the first H-S voltage source.

In another mode commanded by the selector control signal, the H-S source selector and the L-S source selector will pair a coupling of the second HS voltage source to the HS source output with a coupling of the second LS voltage source to the LS source output. As a result, the DC-DC converter circuitry combined with the output filter will provide an output voltage that ranges between a lower voltage level of the second L-S voltage source and a higher voltage level of the second H-S voltage source. In either mode of this exemplary embodiment, the voltage between the H-S converter input terminal and the L-S converter input terminal is around the equivalent voltage level of the second H-S voltage source.

Those skilled in the art will appreciate the scope of the disclosure and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the disclosure and illustrate the best mode of practicing the disclosure. Upon reading the following description in light of the accompanying drawings, those skilled in the art will understand the concepts of the disclosure and will recognize applications of these concepts not particularly addressed herein. It should be understood that these concepts and applications fall within the scope of the disclosure and the accompanying claims.

Figure 1:
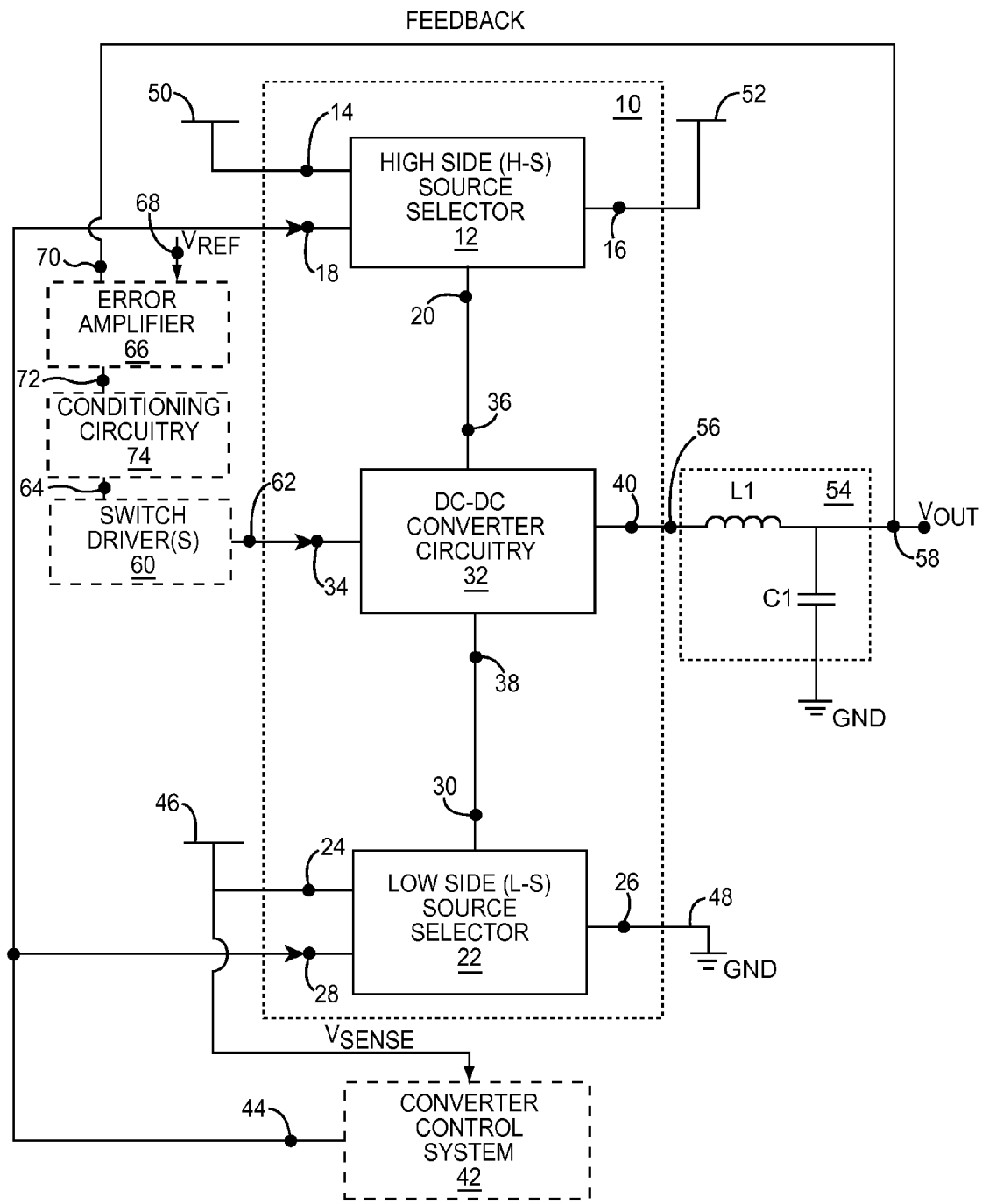
FIG. 1 is a generalized block diagram of a floating power converter in accordance with the present disclosure.

FIG. 1 is a generalized block diagram of a floating power converter 10 that is configured in accordance with the present disclosure. The floating power converter 10 includes a high side (H-S) source selector 12 having a first H-S source terminal 14, a second H-S source terminal 16, an H-S selector control terminal 18, and an H-S source output terminal 20. A low side (L-S) source selector 22 having a first L-S source terminal 24, a second L-S source terminal 26, an L-S selector control terminal 28, and an L-S source output terminal 30 is also included. Moreover, DC-DC converter circuitry 32 has at least one converter control terminal(s) 34, an H-S converter input terminal 36 coupled to the H-S source output terminal 20, an L-S converter input terminal 38 coupled to the L-S source output terminal 30, and a converter output terminal 40.

A converter control system 42 has a control output terminal 44 coupled to the L-S selector control terminal 28 for selecting between a first L-S voltage source 46 coupled to the first L-S source terminal 24 and a second L-S voltage source 48 coupled to the second L-S source terminal 26. The first L-S voltage source 46 is typically a battery such as a mobile phone battery. The second L-S voltage source 48 is typically ground (GND). However, it is to be understood that the first L-S voltage source 46 can be other voltage sources such as a charge pump, and the second L-S voltage source 48 can be another battery, etc. Moreover, a signal $V_{SENSE}$ is coupled between the first L-S voltage source 46 and the converter control system 42 to monitor the voltage level of the first L-S voltage source 46. Other signals (not shown) could be used to monitor the second L-S voltage source 48, a first H-S voltage source 50 and a second H-S voltage source 52.

The control output terminal 44 is also coupled to the H-S selector control terminal 18 for selecting between the first H-S voltage source 50 coupled to the first H-S source terminal 14 and the second H-S voltage source 52 coupled to the second H-S source terminal 16. The first H-S voltage source 50 is typically a charge pump that outputs a voltage that is typically twice the voltage of the second H-S voltage source 52, which is typically a battery such as a mobile phone battery. However, it is to be understood that the first H-S voltage source 50 can be other voltage sources such as a battery, and the second H-S voltage source 52 can be another battery, the first L-S voltage source 46, or a buck converter, etc.

An output filter 54 has a filter input terminal 56 coupled to the converter output terminal 40 and a filter output terminal 58 for providing a filtered output voltage $V_{OUT}$. The output filter 54 typically comprises an inductor L1 coupled between the filter input terminal 56 and the filter output terminal 58. An inductance value of the inductor L1 ranges from around 10 nH to around 100 nH. A filter capacitor C1 is coupled between the filter output terminal 58 and a common node, which is typically GND. A capacitance value of the filter capacitor C1 ranges from around 10 nF to around 100 nF. It is to be understood that output filter 54 can have alternate topologies, and the inductors and capacitors can have inductance and capacitance values different than the exemplary values listed above.

At least one switch driver 60 has a driver output terminal 62 that is coupled to the at least one converter control terminal(s) 34. The at least one switch driver 60 also has at least one drive input terminal(s) 64. An error amplifier 66 has a reference terminal 68 coupled to a voltage reference $V_{REF}$, a feedback input terminal 70 coupled to the filter output terminal 58, and an amplifier output terminal 72 that is communicatively coupled to the at least one drive input terminal(s) 64. Conditioning circuitry 74 can be coupled between the error amplifier 66 and the at least one switch driver 60 to provide level shifting, etc.

As configured in FIG. 1, the DC-DC converter circuitry 32 and the output filter 54 combine to function as a buck converter that can control the voltage level of the output voltage $V_{OUT}$ between ranges of either the first H-S voltage source 50 and first L-S voltage source 46 or the second H-S voltage source 52 and the second L-S voltage source 48. However, it is to be understood that the DC-DC converter circuitry 32 and output filter 54 can have other configurations that function as other types of switching converters such as boost converters. Moreover, it is to be understood that the voltage reference $V_{REF}$ is typically selectable or adjustable to allow a range of voltage levels for the output voltage $V_{OUT}$.

Figure 2:
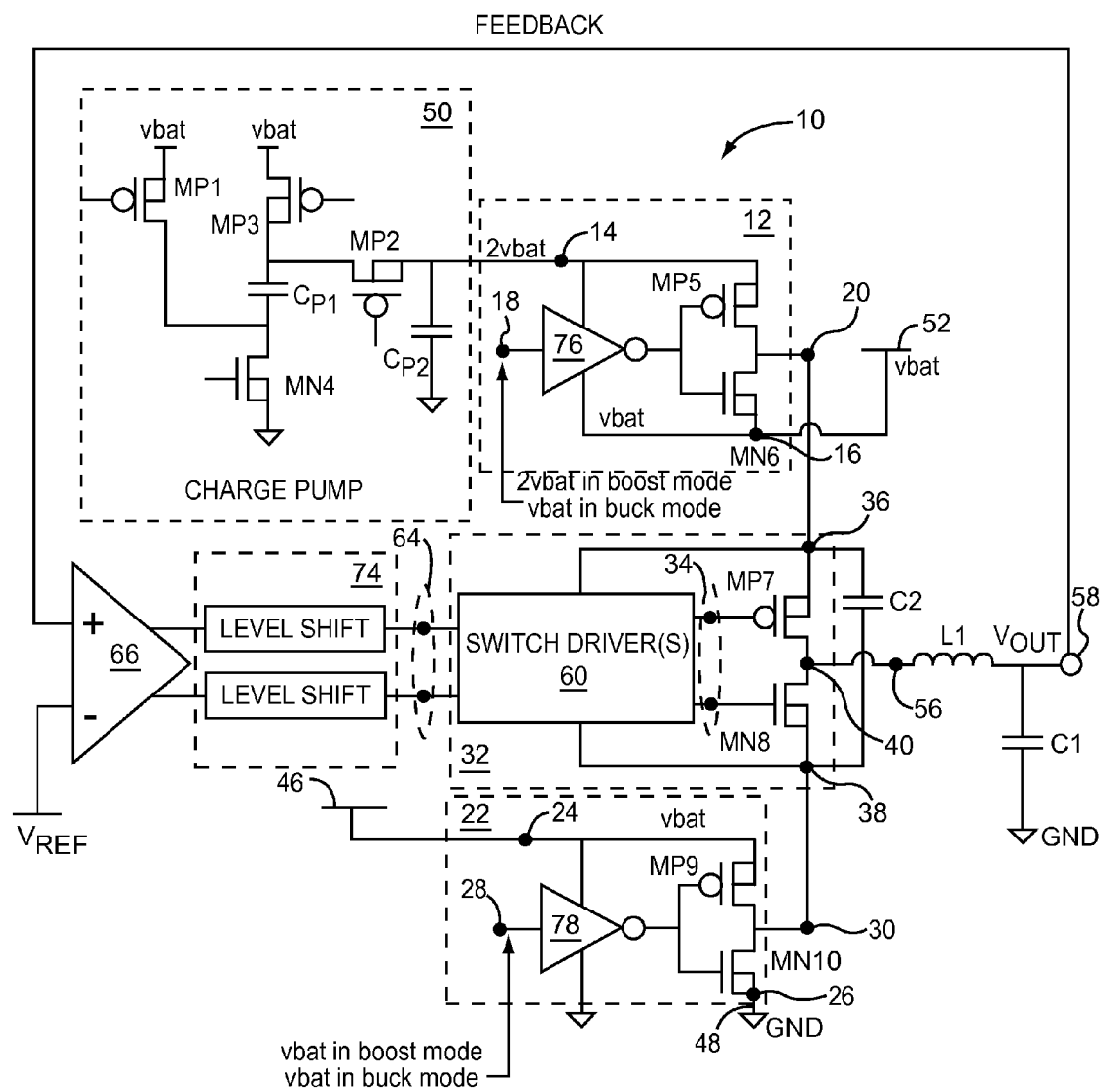
FIG. 2 is a circuit schematic of an embodiment of the floating power converter depicted in the generalized block diagram of FIG. 1.

FIG. 2 is a circuit schematic of an embodiment of the floating power converter depicted in the generalized block diagram of FIG. 1. In this embodiment, the floating power converter 10 is configured as a boost-buck converter. For example, in this exemplary embodiment, the first H-S voltage source 50 is a boost converter of the charge pump type. In this case, the charge pump is made up of transistors MP1, MP2, MP3 and MN4, which are typically of the complementary metal oxide semiconductor (CMOS) type. The charge pump also includes a floating capacitor CP1 and a pump output capacitor CP2.

Ordinarily, the transistors MP1 and MP2 receive power from the second H-S voltage source 52, which in this case is a battery that has a voltage level vbat. In operation, the transistors MP3 and MN4 are turned on to charge the floating capacitor CP1 to the voltage level vbat and then are turned off. Next, the transistor MP1 is turned on to lift the total voltage level on transistor MP2 to 2 vbat. The transistor MP2 is turned on to transfer charge from the floating capacitor C1 to the pump output capacitor CP2. The voltage level 2 vbat is then placed on the first H-S source terminal 14. Switching phases controlling the on and off transitions of the transistors MP1, MP2, MP3 and MN4 typically operate at frequencies that range from around 500 kHz to around 1 MHz, which is around fifty times less that of the range for switching frequencies for the switch driver(s) 60.

In the exemplary embodiment of FIG. 2, the H-S source selector 12 is made up of a pair of complementary transistors MP5 and MN6. The complementary transistors MP5 and MN6 have coupled gates and coupled drains with a first source coupled to the first H-S source terminal 14 for receiving current from the first H-S voltage source 50 and a second source coupled to the second H-S source terminal 16 for receiving current from the second H-S voltage source 52. A first buffer 76 is coupled between the H-S selector control terminal 18 and the gates of the transistors MP5 and MN6 in order to provide sufficient gate drive voltage. In this particular case, a logic high placed on the H-S selector control terminal 18 to select a boost mode will turn off the transistor MN6 and turn on the transistor MP5. As a result, a 2 vbat output is coupled to the H-S source output terminal 20. In contrast, a logic low placed on the H-S selector control terminal 18 to select a buck mode will turn off the transistor MP5 and turn on the transistor MN6 to couple a vbat output to the H-S source output terminal 20.

The DC-DC converter circuitry 32 is made up of a pair of complementary transistors MP7 and MN8 having gates coupled to the converter control terminal(s) 34 and having drains coupled to the converter output terminal 40. However, it is to be understood that the gates of the complementary transistors MP7 and MN8 will in general not be coupled together. In preferred embodiments, the gates of the complementary transistors MP7 and MN8 will be different nodes so that there can be a small delay from the time when the transistor MP7 turns off to the time when the transistor MN8 turns on. The at least one drive input terminal(s) 64 is not typically the same node for the same reasons. The DC-DC converter circuitry 32 further includes a first source coupled to the H-S converter input terminal 36 and a second source coupled to the L-S converter input terminal 38. A bypass capacitor C2 is coupled between the H-S converter input terminal 36 and the L-S converter input terminal 38. A capacitance value for the bypass capacitor C2 ranges from around 10 pF to around 10 nF. As shown in FIG. 2, the switch driver(s) 60 can be incorporated into the DC-DC converter circuitry 32.

Similar to the H-S source selector 12, the L-S source selector 22 is made up of a pair of complementary transistors MP9 and MN10. The complementary transistors MP9 and MN10 have coupled gates and coupled drains with a first source coupled to the first L-S source terminal 24 for receiving current from the first L-S voltage source 46 and a second source coupled to the second L-S source terminal 26 for receiving current from the second L-S voltage source 48. A second buffer 78 is coupled between the L-S selector control terminal 28 and the gates of the transistors MP9 and MN10 in order to provide sufficient gate drive voltage. In this particular case, a logic high placed on the L-S selector control terminal 28 to select the boost mode will turn off the transistor MN10 and turn on the transistor MP9. As a result, an output of vbat is coupled to the L-S source output terminal 30. In contrast, a logic low placed on the L-S selector control terminal 28 to select the buck mode will turn off the transistor MP9 and turn on the transistor MN10 to couple an output of ground potential to the L-S source output terminal 30.

Figure 3:
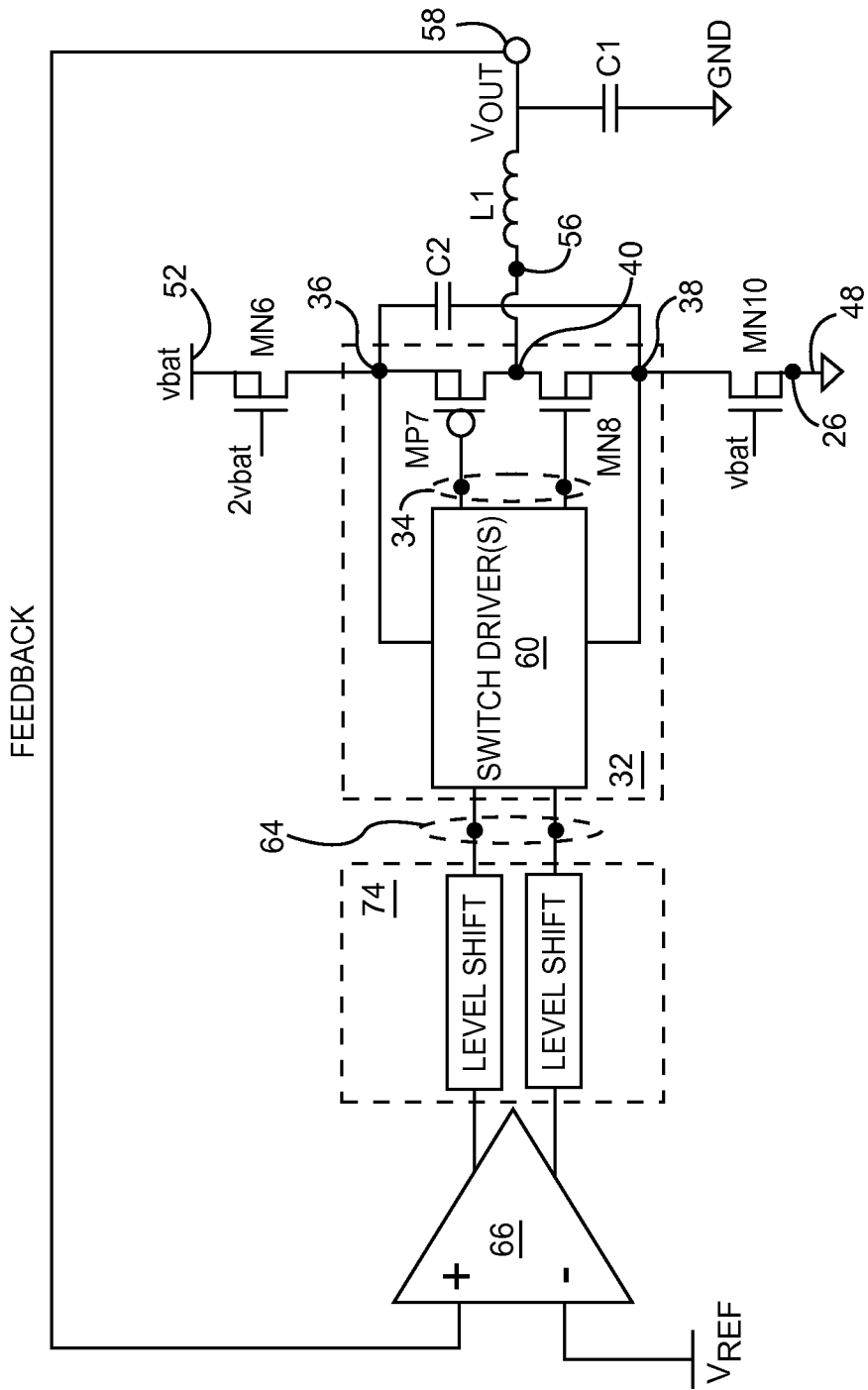
FIG. 3 is a circuit schematic of the floating power converter depicted operating in a buck mode.

FIG. 3 is a circuit schematic of the floating power converter 10 depicted operating in the buck mode. In the buck mode, the transistor MP5 (FIG. 2) and the transistor MP9 (FIG. 2) are off. Since the transistor MP5 and the transistor MP9 are off for the duration of the buck mode they are omitted from the schematic of FIG. 3. Moreover, the charge pump version of the first H-S voltage source 50 supplies only leakage current during the buck mode and is also omitted from the schematic of FIG. 3. In this particular case and while in the buck mode, the charge pump version of the first H-S voltage source 50 can be operated at very low frequencies relative to switching frequencies that range from around 500 kHz to around 1 MHz.

Since the transistors MN6 and MN10 are on during the buck mode, the voltage level at the H-S converter input terminal 36 is vbat and the voltage level at the L-S converter input terminal 38 is at ground potential. As a result, the voltage at the converter output terminal 40 swings from between ground potential and close to vbat. The output voltage $V_{OUT}$ is determined by the duty-cycle of a switching signal generated by the switch driver(s) 60 and applied to the gates of the transistors MP7 and MN8. In the buck mode, the output voltage can range from about zero volts to about vbat. In the exemplary embodiment shown in FIG. 3, a desired voltage level for the output voltage $V_{OUT}$ is set by the reference voltage $V_{REF}$, which can optionally be set by the converter control system 42 (FIG. 1).

A switch stress on the transistors MP7 and MN8 is about equal to vbat. Therefore, additional series transistors and/or larger transistors typically employed to meet a voltage breakdown requirement are unnecessary with regard to the transistors MP7 and MN8. Moreover, the capacitance values attributable to the transistors MN6 and MN10 do not result in significant power loss because the transistors MN6 and MN10 switch only when transitioning between buck and boost mode, which happens at a frequency which is much less than the nominal switching frequency. As such, the transistors MN6 and MN10 can be fabricated to be relatively large in comparison to the transistors MP7 and MN8. The relative larger size for transistors MN6 and MN10 make for a relatively much lower drain to source on resistance $rds_{on}$. A preferred scale between the transistors MN6 and MN10 and the transistors MP7 and MN8 is around 5:1.

Figure 4:
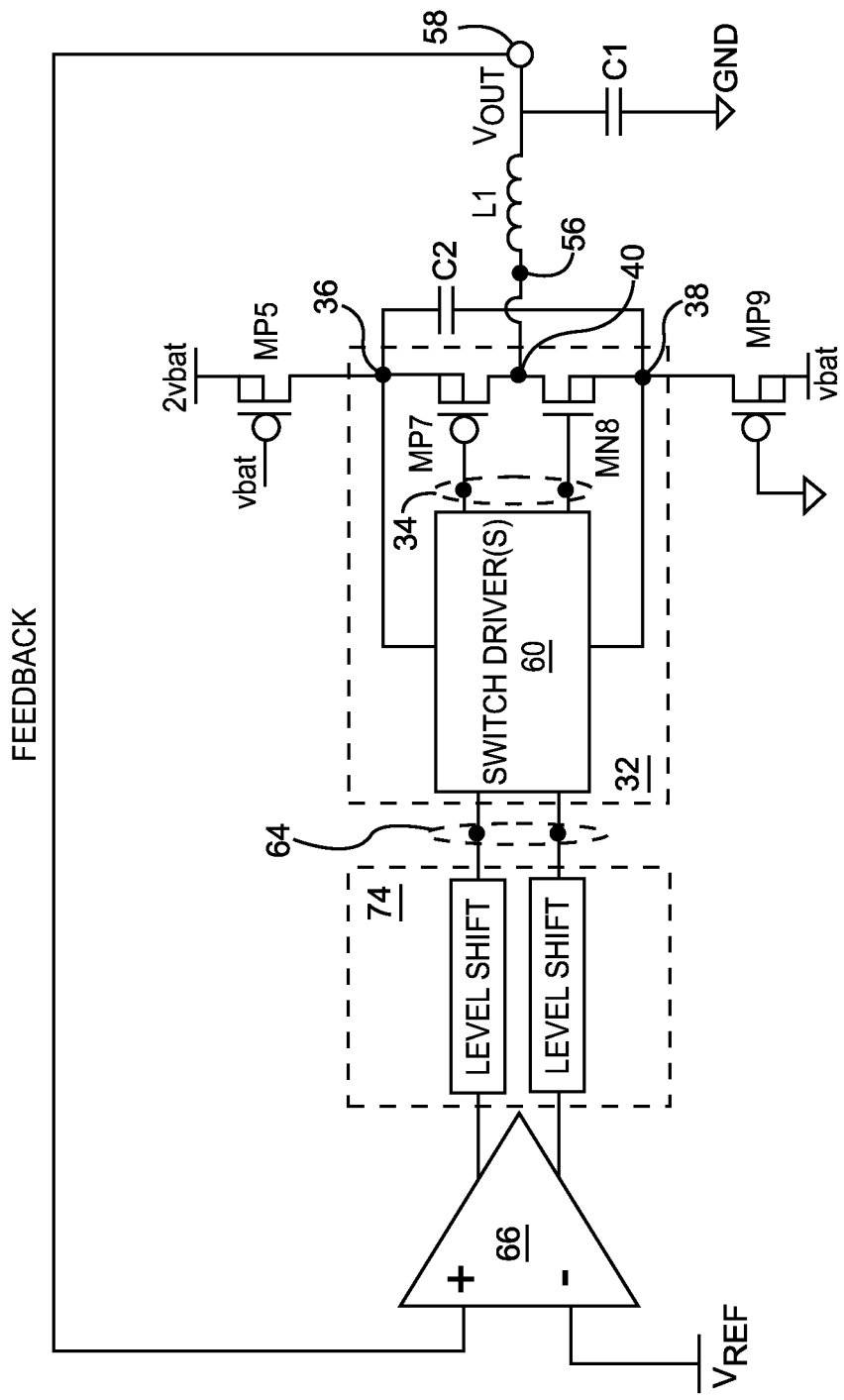
FIG. 4 is a circuit schematic of the floating power converter depicted operating in a boost mode.

FIG. 4 is a circuit schematic of the floating power converter 10 depicted operating in the boost mode. In the boost mode, the transistor MN6 (FIG. 2) and the transistor MN10 (FIG. 2) are off and are omitted from the schematic of FIG. 4. The charge pump version of the first H-S voltage source 50 (FIG. 2) is omitted from the schematic of FIG. 4 for the purpose of simplification since those skilled in the art will recognize that the charge pump version of the first H-S voltage source 50 supplies charge current during the boost mode. In this particular case and while in the boost mode, the charge pump version of the first H-S voltage source 50 is operated at switching frequencies that range from around 500 kHz to around 1 MHz.

Since the transistors MP5 and MP9 are on during the boost mode, the voltage level at the H-S converter input terminal 36 is at 2 vbat and the voltage level at the L-S converter input terminal 38 is at vbat. As a result, the voltage at the converter output terminal 40 swings from between vbat and about 2 vbat in the boost mode. The output voltage $V_{OUT}$ is determined by the duty-cycle of a switching signal generated by the switch driver(s) 60. In the exemplary embodiment shown in FIG. 4, a desired voltage level for the output voltage $V_{OUT}$ is set by the reference voltage $V_{REF}$, which can be set by the converter control system 42 (FIG. 1).

As before, the switch stress on the transistors MP7 and MN8 is only about equal to vbat. As a result, losses due to capacitances near the converter output terminal 40 are around a quarter of what they would typically be if the voltage swing at the converter output terminal 40 were 2 vbat. Moreover, the voltage/current ripple associated with the output voltage $V_{OUT}$ is less with the voltage swing at the converter output terminal 40 being only around vbat. As such, a smaller inductance value for the inductor L1 is needed than normally required with a 2 vbat swing. Moreover, the capacitance values attributable to the transistors MP5 and MP9 do not cause significant power loss because the transistors MP5 and MP9 switch only when transitioning between buck and boost mode, which happens at a frequency which is much less than the nominal switching frequency. As such, the transistors MP5 and MP9 can be fabricated to be relatively large in comparison to the transistors MP7 and MN8. The relative larger size for transistors MP5 and MP9 make for a relatively much lower drain to source on resistance $rds_{on}$. A preferred scale between the transistors MP5 and MP9 and the transistors MP7 and MN8 is around 5:1.

Figure 5:
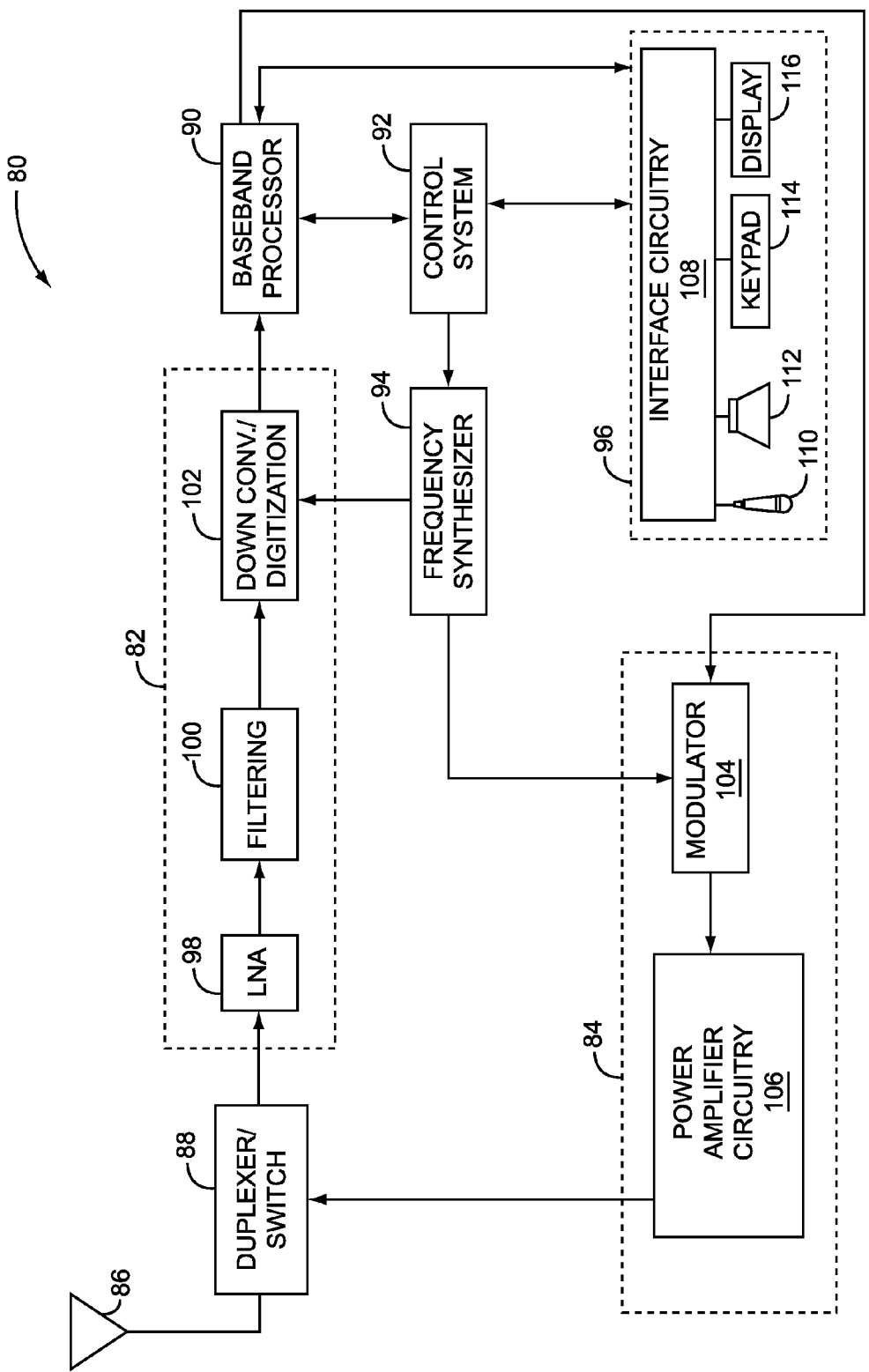
FIG. 5 is an application example for the disclosed floating power converter used in a mobile terminal, which is depicted in a generalized block diagram.

An example of the floating power converter 10 used in an application is its inclusion in a battery powered mobile terminal to provide regulated power. The basic architecture of a mobile terminal 80 is represented in FIG. 5 and may include a receiver front end 82, a radio frequency transmitter section 84, an antenna 86, a duplexer or switch 88, a baseband processor 90, a control system 92, a frequency synthesizer 94, and an interface 96. The control system 92 is usable as the converter control system 42 (FIG. 1). The receiver front end 82 receives information bearing radio frequency signals from one or more remote transmitters provided by a base station. A low noise amplifier (LNA) 98 amplifies the signal. A filter circuit 100 minimizes broadband interference in the received signal, while down conversion and digitization circuitry 102 down converts the filtered, received signal to an intermediate or baseband frequency signal, which is then digitized into one or more digital streams. The receiver front end 82 typically uses one or more mixing frequencies generated by the frequency synthesizer 94. The baseband processor 90 processes the digitized received signal to extract the information or data bits conveyed in the received signal. This processing typically comprises demodulation, decoding, and error correction operations. As such, the baseband processor 90 is generally implemented in one or more digital signal processors (DSPs).

On the transmit side, the baseband processor 90 receives digitized data, which may represent voice, data, or control information, from the control system 92, which it encodes for transmission. The encoded data is output to the transmitter 84, where it is used by a modulator 104 to modulate a carrier signal that is at a desired transmit frequency. Power amplifier circuitry 106 amplifies the modulated carrier signal to a level appropriate for transmission, and delivers the amplified and modulated carrier signal to the antenna 86 through the duplexer or switch 88.

A user may interact with the mobile terminal 80 via the interface 96, which may include interface circuitry 108 associated with a microphone 110, a speaker 112, a keypad 114, and a display 116. The interface circuitry 108 typically includes analog-to-digital converters, digital-to-analog converters, amplifiers, and the like. Additionally, it may include a voice encoder/decoder, in which case it may communicate directly with the baseband processor 90. The microphone 110 will typically convert audio input, such as the user's voice, into an electrical signal, which is then digitized and passed directly or indirectly to the baseband processor 90. Audio information encoded in the received signal is recovered by the baseband processor 90, and converted by the interface circuitry 108 into an analog signal suitable for driving the speaker 112. The keypad 114 and display 116 enable the user to interact with the mobile terminal 80, input numbers to be dialed, address book information, or the like, as well as monitor call progress information.

Those skilled in the art will recognize improvements and modifications to the embodiments of the present disclosure. All such improvements and modifications are considered within the scope of the concepts disclosed herein and the claims that follow.

What is claimed is:

1. A floating power conversion system comprising:
direct current to direct current (DC-DC) converter circuitry having at least one converter control terminal for receiving at least one control signal, a high side (H-S) converter input terminal configured to receive a first positive voltage level during operation in a first mode and a second positive voltage level that is lower than the first positive voltage level during operation in a second mode, a low side (L-S) converter input terminal configured to receive the first positive voltage level during operation in the first mode and a zero voltage level relative to the first positive voltage level and the second positive voltage level during operation in the second mode, and a converter output terminal coupled at a node between the H-S converter input terminal and the L-S converter input terminal;
an H-S source selector configured to selectively couple non-rectified DC voltage from either a first H-S voltage source or a second H-S voltage source to the H-S converter input terminal in response to a selector control signal, wherein the first H-S voltage source provides the first positive voltage level and the second H-S voltage source provides the second positive voltage level; and
an L-S source selector configured to selectively couple non-rectified DC voltage from either a first L-S voltage source or a second L-S voltage source to the L-S converter input terminal in response to the selector control signal wherein the first L-S voltage source provides the first positive voltage level and the second L-S voltage source provides the zero voltage level.

2. The floating power conversion system of claim 1 further including a control system that generates the selector control signal.

3. The floating power conversion system of claim 2 wherein the control system is configured to command the first mode that provides a first output voltage range between the relatively higher voltage level of the first H-S voltage source and the relatively lower voltage level of the first L-S voltage source and the second mode that provides a second output voltage range between the relatively higher voltage level of the second H-S voltage source and the relatively lower voltage level of the second L-S voltage source.

4. The floating power conversion system of claim 1 further including an output filter having a filter input terminal coupled to the converter output terminal and a filter output terminal.

5. The floating power conversion system of claim 4 wherein the output filter comprises an inductor coupled between the filter input terminal and the filter output terminal and a filter capacitor coupled between the filter output terminal and a voltage node.

6. The floating power conversion system of claim 5 wherein the voltage node is at ground potential.

7. The floating power conversion system of claim 5 wherein an inductance value of the inductor ranges from around 10 nH to around 100 nH.

8. The floating power conversion system of claim 5 wherein a capacitance value of the filter capacitor ranges from around 10 nF to around 100 nF.

9. The floating power conversion system of claim 5 further including at least one switch driver having a drive output terminal coupled to the at least one converter control terminal and a drive input terminal.

10. The floating power conversion system of claim 9 further including an error amplifier having a reference terminal coupled to a voltage reference, a feedback terminal coupled to the filter output terminal, and an amplifier output terminal communicatively coupled to the drive input terminal.

11. The floating power conversion system of claim 10 further including conditioning circuitry coupled between the amplifier output terminal and the drive input terminal of the at least one switch driver.

12. The floating power conversion system of claim 11 wherein the conditioning circuitry comprises at least one level shifter.

13. The floating power conversion system of claim 1 wherein the DC-DC converter circuitry is configured as a buck converter.

14. The floating power conversion system of claim 13 wherein the first H-S voltage source is a boost converter.

15. The floating power conversion system of claim 14 wherein the second H-S voltage source and the first L-S voltage source are a battery and the second L-S voltage source is at ground potential.

16. The floating power conversion system of claim 1 wherein the H-S source selector comprises a pair of complementary transistors having coupled gates and coupled drains with a first source for receiving current from the first H-S voltage source and a second source for receiving current from the second H-S voltage source.

17. The floating power conversion system of claim 1 wherein the L-S source selector comprises a pair of complementary transistors having coupled gates and coupled drains with a first source for receiving current from the first L-S voltage source and a second source for receiving current from the second L-S voltage source.

18. The floating power conversion system of claim 1 wherein the DC-DC converter circuitry comprises a pair of complementary transistors having gates coupled to the at least one converter control terminal and having drains coupled to the converter output terminal and further including a first source coupled to the H-S converter input terminal and a second source coupled to the L-S converter input terminal.

19. The floating power conversion system of claim 1 further including a bypass capacitor coupled between the H-S converter input terminal and the L-S converter input terminal.

20. The floating power conversion system of claim 19 wherein a capacitance value for the bypass capacitor ranges from around 10 pF to around 10 nF.

* * * * *